United States Patent [19]

Hufford

[11] Patent Number: 4,971,337
[45] Date of Patent: Nov. 20, 1990

[54] MECHANICAL SEAL ASSEMBLY

[75] Inventor: Larry A. Hufford, Vista, Calif.

[73] Assignee: BW/IP International, Inc., Long Beach, Calif.

[21] Appl. No.: 416,847

[22] Filed: Oct. 4, 1989

Related U.S. Application Data

[63] Continuation of Ser. No. 199,335, May 26, 1988, abandoned.

[51] Int. Cl.$^5$ .......................... F16J 15/36; F16J 15/38
[52] U.S. Cl. .......................................... 77/85; 277/89; 277/93 SD
[58] Field of Search .................. 277/88, 89, 90, 93 R, 277/93 SD, 81 R, 85, 87

[56] References Cited

U.S. PATENT DOCUMENTS

| | | | |
|---|---|---|---|
| 3,276,780 | 10/1966 | Andresen et al. | 277/42 |
| 3,356,378 | 12/1967 | Tracy | 277/81 R |
| 3,475,033 | 10/1969 | Voitik | 277/42 |
| 3,764,150 | 10/1973 | Newkirk | 277/42 |
| 3,773,337 | 11/1973 | Adams | 277/42 |
| 3,895,813 | 7/1975 | Davies et al. | 277/88 |
| 4,103,904 | 8/1978 | Tankus | 277/42 |
| 4,124,218 | 11/1978 | Wentworth, Jr. | 277/86 |
| 4,580,793 | 4/1986 | Bronson | 277/199 |
| 4,653,980 | 3/1987 | Wentworth | 277/92 |
| 4,693,481 | 9/1987 | Quinn | 277/224 |
| 4,744,569 | 5/1988 | Wentworth, Jr. et al. | 277/88 |

FOREIGN PATENT DOCUMENTS

| | | | |
|---|---|---|---|
| 262880 | 1/1962 | Australia | 277/27 |
| 58-113662 | 7/1983 | Japan | 277/27 |
| 59-194170 | 11/1984 | Japan | 277/27 |
| 661330 | 7/1987 | Switzerland | 277/27 |
| 1076676 | 2/1984 | U.S.S.R. | 277/27 |
| 1447569 | 8/1976 | United Kingdom | 277/93 |
| 2118641 | 11/1983 | United Kingdom | 277/27 |

Primary Examiner—Allan N. Shoap
Assistant Examiner—Diego F. F. Gutierrez
Attorney, Agent, or Firm—Aubrey L. Burgess

[57] ABSTRACT

An improved mechanical seal using hard non-weldable seal rings in which the seal ring is supported by a seal ring flange and in which a GRAFOIL gasket is positioned in an annular recess between the seal ring and the flange; the seal ring being held in the flange by means of a retainer ring welded to the flange, thereby avoiding the use of interference fits and/or lap fits between the flange and the seal ring.

5 Claims, 1 Drawing Sheet

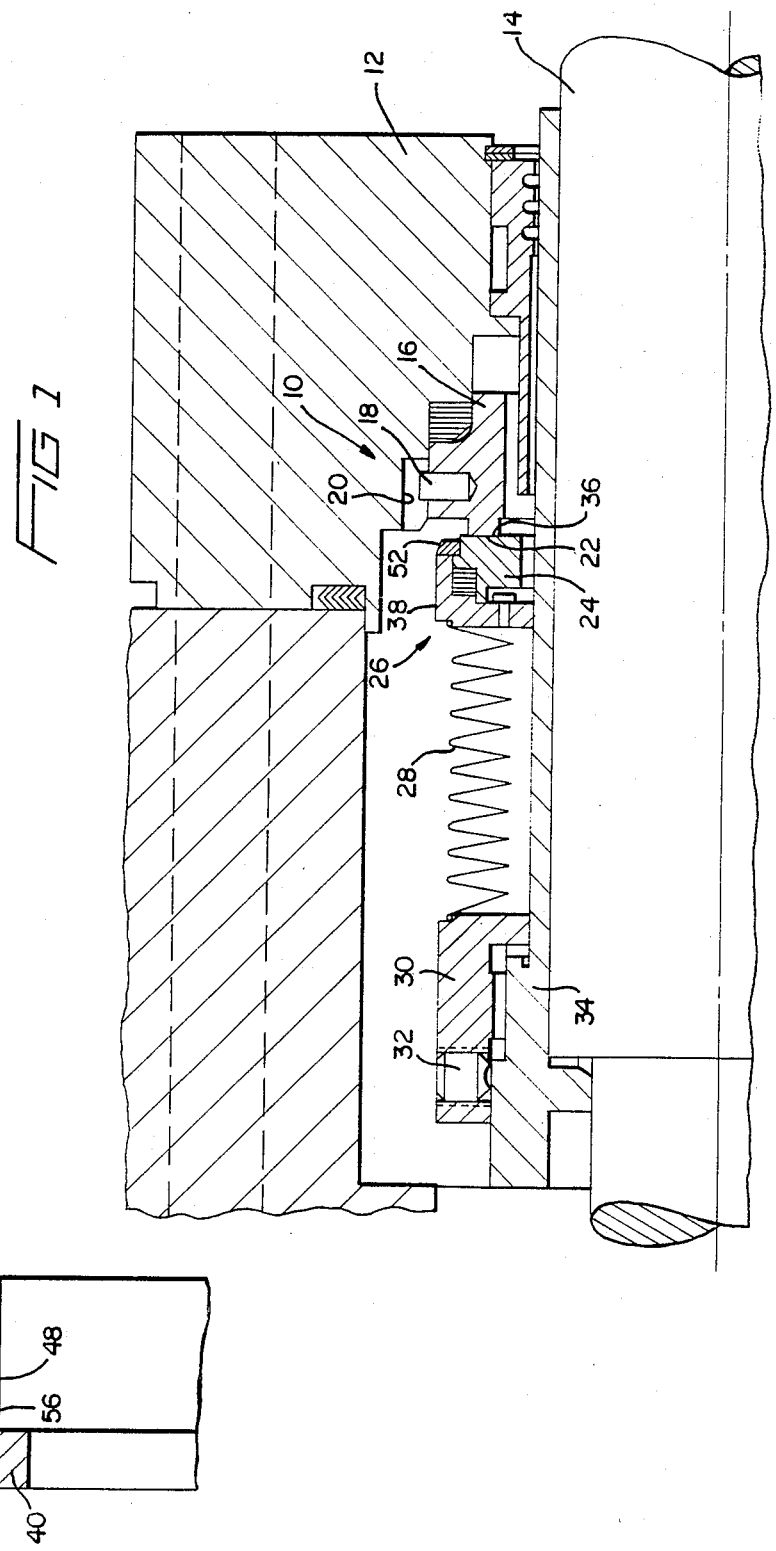

MECHANICAL SEAL ASSEMBLY

This is a continuation of application Ser. No. 07/199,335, filed May 26, 1988, now abandoned.

FIELD OF THE INVENTION

This invention relates to mechanical seal assemblies and particularly to bellows mechanical seal assemblies having an improved arrangement for attaching a hard faced seal ring and its supporting means to the bellows, permitting the use of high temperature, corrosion resistant alloys with non-weldable seal rings, and avoiding the use of interference and/or lap joint fits between a seal ring and its supporting flange.

BACKGROUND OF THE INVENTION

Mechanical seal assemblies are conventionally used in fluid handling apparatus, such as pumps and the like, to substantially prevent the leakage of process fluid, which may be corrosive, along a shaft to the motor or bearing system which drives the apparatus. Such leakage could seriously affect the motor or bearing system and probably cause its destruction. Mechanical seal assemblies generally are constructed with a pair of seal rings, one connected to and rotatable with the shaft, and the other, non-rotatable and connected to the housing and the like. Each seal ring is provided with a lapped seal face, the seal faces of the rings oppose one another in engaging relationship, and rotate relative to one another. At least one of the seal rings is constructed of a relatively hard, non-weldable material, such as silicon carbide, tungsten carbide and the like, while the other seal ring is constructed of a similar or different material which could be silicon carbide, a graphitic material and the like. Means, such as springs, bellows and the like are employed to urge the seal faces in rubbing contact with one another. A slight leakage of fluid, which may be supplied to the seal faces, cools and lubricates the relatively rotating and engaging seal faces to prolong their useful operating life.

The rubbing contact between the seal faces of mechanical seals and the wear characteristics of seal rings dictates the use of relatively hard materials for the seal rings, such as the aforesaid silicon carbide and the like. The attachment and sealing of these hard materials to the supporting structure of the assembly is dependent upon the material used, the particular arrangement of components, and the operating conditions of the assembly. In some assemblies, a secondary elastomeric seal, such as an elastomer O-ring is used between the seal ring and its supporting structure, as for example, a support flange. In high temperature apparatus, on the order of 500 degrees F. and above, a secondary elastomeric seal between a seal ring and its supporting structure cannot be used because of the temperature limitations of the elastomeric material. Traditionally, high temperature mechanical seals have utilized lap joints or mechanical interference fits between the seal ring and its supporting structure constructed of low expansion alloy materials. The lap joint arrangement functions well, but is very maintenance intensive and critical due to dirt contamination during assembly. Lower expansion alloy seal ring supporting structure-seal ring interference fits are also, functional; however, because the lower expansion alloys characteristically have low corrosion resistance, they are not compatible with high temperature and corrosive fluids and fail rapidly, necessitating repair and/or replacement. The repair and/or replacement of a mechanical seal assembly is a costly procedure requiring considerable down time of the fluid handling apparatus with loss of productivity.

DISCUSSION OF PRIOR ART

Hershey U.S. Pat. No. 4,364,571, issued Dec. 21, 1982, discloses a mechanical seal assembly using a "GRAFOIL" (trademark) gasket or packing 28 positioned in an annular recess formed between a gland 19 supporting a seal ring 31 and an insert 26, the packing 28 being exposed to product fluid causing the packing to lose its resiliency after substantial usage, presumably because it becomes filled with the fluid.

Back U.S. Pat. No. 4,386,785, issued June 7, 1983, discloses a bellows mechanical seal arrangement in which a retaining flange 6 holds a seal ring 5 in contact with a seat 3, the bellows providing a resilient force to the flange 6.

THE INVENTION

According to the invention herein disclosed, it is proposed to provide an improved mechanical seal assembly utilizing corrosive resistance materials and a secondary laminated gasket between a seal ring and its supporting structure for high temperature applications. The gasket is preferably being made of a graphite material generally sold under the name "GRAFOIL" to thus overcoming the temperature limitations of elastomeric gaskets, and further to avoid the concerns of a loose lap joint. The gasket provides a positive connection of a seal ring made of a hard, non-weldable material, such as silicon carbide, tungsten carbide and the like, to a seal ring supporting structure or flange constructed of a high temperature, corrosion resistant alloy, such as 316 stainless steel, Hastelloy C and the like, capable of enduring the relatively elevated temperatures contemplated and use with corrosive fluids. The gasket is preferably constructed of a plurality of stacked washer or washer-like wafers or plates of GRAFOIL and thus possesses a natural resiliency. In addition to the gasket, an attachment ring generally of the same metal as the supporting structure or flange, is welded to the high temperature and corrosion resistant metal alloy supporting structure. This attachment ring is employed to make an integral assembly of supporting structure, gasket, seal ring and attachment ring. In the construction according to this invention, the gasket is positioned in an annular recess or pocket defined by the seal ring and its supporting structure. This construction insures that the gasket is substantially protected from exposure to process fluid, so that it will retain its resiliency for a considerable length of time during its use and, because of its resiliency, will urge the seal ring into intimate contact with the attachment ring.

Preferably, a metal bellows constructed of welded together metal washer-like plates or members is welded at one end to a seal ring supporting flange and to a bellows flange at the other end. The bellows flange is drivingly connected to the rotatable shaft of the fluid handling apparatus, or, if the seal assembly is constructed as a cartridge, to a shaft sleeve which encircles the shaft and provides a driving connection therewith. The bellows resiliency urges the seal ring connected thereto toward the opposing seal ring, so that their faces engage one another. The bellows provides a driving connection between the shaft or the shaft sleeve, as the case may be, and the seal ring supporting structure.

A positive drive between the supporting structure and the supported seal ring is provided by an anti-rotational pin which extends from the supporting structure into a suitable opening in the seal ring.

Alternatively, the bellows can be fixed to the housing, so as to urge the non-rotatable seal ring toward the rotatable seal ring.

BRIEF DESCRIPTION OF THE DRAWINGS

FIG. 1 is an axial, partial sectional view of a mechanical seal assembly constructed according to this invention; and FIG. 2 is an enlarged sectional view of a portion of FIG. 1 showing the features of this invention.

DESCRIPTION OF THE PREFERRED EMBODIMENTS

Looking now at the drawings, and especially FIG. 1, there is illustrated a mechanical seal assembly 10 associated with a multiple part housing 12 and a rotatable shaft 14, the shaft 14 being connected at one end to a motor (not shown) and at the other end to a fluid handling device, such as a pump and the like (not shown). The mechanical seal assembly 10 functions to substantially prevent product fluid being handled by the fluid handling device from leaking along the shaft to the motor or bearing system to the atmosphere.

The mechanical seal assembly comprises a seal ring 16 connected to the housing 12 by a drive pin 18 fitting into a slot 20 in the housing 12. Thus the seal ring 16 is a non-rotatable seal ring. The seal ring 16 which may be constructed of carbon graphite, silicon carbide, tungsten carbide, a ceramic and the like, has a lapped, radially oriented, and annular seal face 22. The seal assembly further comprises a seal ring 24 connected by means of a retainer assembly 26, a bellows 28, an annular bellows flange 30, and a drive pin 32 to a shaft sleeve 34 engaging the rotatable shaft 14. Positive connecting means (not shown) may be use to insure the driving connection between the shaft sleeve 34 and the shaft 14. Thus the seal ring 24 is rotatable with the shaft 14. The seal ring 24 is preferably constructed of a non-weldable material, such as silicon carbide or tungsten carbide, has a lapped, radially oriented, and annular seal face 36 which opposes and contacts the seal face 22 of the seal ring 16. When the shaft 14 is rotating, the seal faces 22 and 36 of the seal rings 16 and 24 contact and rotate relative to one another.

As illustrated in FIG. 1, the mechanical seal assembly is constructed as a cartridge by using the shaft sleeve 34 which encircles the shaft 14 and rotates therewith. The shaft sleeve 34 may be omitted, if necessary and/or desirable without affecting the inventive concept of this invention. However, when the seal assembly is constructed as a cartridge, repair and/or replacement of the assembly is simplified because the assembly can be removed from the fluid handling apparatus as a unit and is easily replaced as a unit, reducing down time of the fluid handling apparatus.

Looking from left to right in FIG. 1, the bellows 28, is preferably constructed of a plurality of annular metal plates welded together in an integral structure, as known in the prior art. The bellows is welded at one end to the bellows flange 30 and at its opposite end to a seal ring support flange 38 of the retainer assembly 26. As previously explained, the bellows 28 provides a resilient force to urge the seal ring 24 toward the seal ring 16. When assembled, the bellows 28 is compressed to some degree to permit it to function as an axial force producing element.

The seal ring flange 38, see especially FIG. 2, has a radial portion 40 and a cylindrical portion 42, the portion 42 having an inner diameter substantially equal to the outer diameter of the seal ring 24. The seal ring 24 is provided with a reduced diameter rear portion 44 and a reduced diameter forward portion 46. The cylindrical portion 42 of the flange 38 has an axial length substantially equal to the axial length of the seal ring 24 minus the axial length of the forward portion 46. The flange 38 and the reduced diameter rear portion 44 of the seal ring 24 form an annular recess, cavity or pocket 48 which receives a gasket 50, preferably constructed of stacked washer or washer-like wafers or plates of a graphite material sold under the name "GRAFOIL". Because of the laminations, the gasket 50 possesses limited resiliency, and becomes slightly compressed during assembly of the seal ring-retainer flange, as will be explained.

A retaining ring member 52 is welded, as at 54, to the cylindrical portion 42 of the flange 38 and is constructed of such size and dimensions to fit onto the reduced diameter forward portion 46 of the seal ring 24. The ring member 52 functions to maintain the seal ring 24 in the flange 38 with the gasket 50 providing, because of its limited resiliency, a seal against substantial leakage of process fluid into the interface of the seal ring 24 and its supporting flange 38. Also the use of a lap joint is avoided; the outer diameter of the seal ring 24 substantially matches the inner diameter of the flange 38, without the critical fit of a lap joint. Suitable precautions are taken during the assembly of the seal ring and the flange 38 to insure a substantial fit of the ring 24 in the flange 38, as explained hereinafter.

A single drive pin 54A extending from the radial portion of the flange 38 and into a pocket 56 in the seal ring 24 insures a positive drive between the shaft 14 and the seal ring 24.

The procedure for installing the seal ring 24 into the flange 38 is as follows:

1. The pin 54A is inserted into the flange 38 before assembly of the flange with the seal ring.

2. The gasket 50 is installed onto the seal ring and then the flange is heated by induction heating to expand the flange to receive the seal ring 24.

Alternatively, the seal ring can be press fitted into the supporting flange avoiding the induction heating step.

3. The retaining ring member 52 is installed onto the seal ring and against the flange.

4 Pressure is applied to the retaining ring member 52 to seat ring 52 against the flange and to compress the gasket 50.

5. The retaining ring member 52 is welded to the flange 38 while applying pressure as in step 4.

6. The assembly is tested for leakage into the gasket.

Applicant has thus provided an improved mechanical seal assembly which can us high temperature, corrosion resistance alloys for a supporting flange for a hard, non-weldable seal ring, without using non-reliable mechanical interference fits or lap joints between the seal ring and its supporting flange.

The appended claims are intended to cover all reasonable equivalents and are to be interpreted as broadly as the prior art will permit.

I claim:

1. A mechanical seal assembly constructed for elevated temperature use to substantially prevent the leakage of product fluid being handled by a fluid handling device to a motor driving the fluid handling device and to the atmosphere, comprising:
- a housing;
- a rotatable shaft surrounded by said housing and connecting said fluid handling device and said motor;
- a pair of seal rings, one being connected for rotation with said shaft and the other being non-rotatable and connected to said housing, one of said seal rings being arranged for limited axial movement relative to said shaft;
- said seal rings having radial seal faces opposing and contacting one another with one seal face rotating relative to the other;
- means resiliently urging one of said seal rings axially toward the other of said seal rings;
- one of said seal rings being formed of a relatively hard and non-weldable carbide material;
- a seal ring flange having a cylindrical portion surrounding an outer cylindrical surface of said carbide seal ring and a radial portion in engagement with another portion of said carbide seal ring, said flange being spaced axially and radially of the seal face of said carbide seal ring;
- means defining a radial surface on said carbide seal ring at a location thereon free of engagement of said flange;
- a high temperature resilient gasket positioned in a cavity defined between said carbide seal ring and said seal flange and providing a resilient structure, said gasket being substantially protected from the product fluid by said carbide seal ring and said seal flange, said gasket being laminated and constructed of a plurality of stacked annular wafer-like members; and
- a retaining ring abutting and contacting said radial surface on said carbide seal ring, said retaining ring being welded at its outer periphery to said seal flange for retaining said carbide seal ring in said seal flange and against said gasket, said gasket being compressed in said cavity and resiliently urging said carbide seal ring toward said retaining ring to seal said carbide seal ring and said retaining ring against the ingress of product fluid therebetween;
- said seal ring flange and said retaining ring being formed of a corrosion resistant metal alloy.

2. A mechanical seal assembly as recited in claim 1, further comprising an annular reduced portion at one end of said carbide seal ring to thus define said radial surface and an axially extending cylindrical surface, said retaining ring being received around said axially extending cylindrical surface and abutting said radial surface, said carbide seal ring being said rotatable seal ring.

3. A mechanical seal assembly as recited in clam 2, wherein said means resiliently urging said rotatable seal ring axially toward the non-rotatable seal ring comprises a bellows, and further comprising a positive drive connection between said rotatable seal ring and said seal flange, and thus said bellows and said shaft, said positive drive connection comprising a drive pin projecting axially from said seal flange and received in a radial groove in said rotatable seal ring.

4. A cartridge mechanical seal sub-assembly comprising:
- a cylindrical sleeve adapted to encircle a shaft connecting a motor to a fluid handling device;
- a seal ring constructed of a hard and non-weldable carbide material having a radial face and a radial surface at one end, said seal ring surrounding said sleeve and being connected thereto for limited axial movement relative thereto;
- a flange of a corrosive resistant metal, said flange having a radial portion surrounding an outer surface of said seal ring and having a radial portion at one end extending toward said shaft;
- a positive drive connection between said flange and said seal ring comprising a drive pin projecting axially from said seal flange and received in a radial groove in said seal ring;
- a resilient means with a first end and a second end, said resilient means being connected at one of said ends to said sleeve and at the other of said ends to said seal ring flange, said resilient means connecting said seal ring and said sleeve;
- a annular cavity defined by said seal flange and said seal ring;
- a resilient high temperature resistant laminated gasket in said cavity; and
- a retaining ring constructed of a corrosion resistant metal;
- said seal flange having a free end opposite the radially extending portion, said retaining ring being welded to said free end and abutting said radial surface on said seal ring,
- said gasket being compressed in said cavity and resiliently urging said carbide seal ring toward said retaining ring.

5. A cartridge mechanical seal sub-assembly as recited in claim 4, further comprising;
- an annular reduced portion at one end of said seal ring defining said radial surface; and
- an axially extending cylindrical surface to receive said retaining ring therearound.

* * * * *